United States Patent
Avola (10) Patent No.: US 11,168,580 B2
(45) Date of Patent: Nov. 9, 2021

(54) ENGINE SYSTEM INCLUDING PIVOTING VANE TURBOCHARGER HAVING VANE(S) THAT ARE ADJUSTABLE TO ONE POSITION WHILE OTHER VANE(S) OF THE TURBOCHARGER ARE ADJUSTED TO ANOTHER POSITION

(71) Applicant: GM GLOBAL TECHNOLOGY OPERATIONS LLC, Detroit, MI (US)

(72) Inventor: Calogero Avola, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 136 days.

(21) Appl. No.: 16/737,327

(22) Filed: Jan. 8, 2020

(65) Prior Publication Data

US 2021/0207489 A1    Jul. 8, 2021

(51) Int. Cl.
| | |
|---|---|
| *F01D 17/16* | (2006.01) |
| *F02B 27/06* | (2006.01) |
| *F01D 7/00* | (2006.01) |
| *F02M 26/05* | (2016.01) |

(52) U.S. Cl.
CPC ............ *F01D 17/165* (2013.01); *F01D 7/00* (2013.01); *F02B 27/06* (2013.01); *F02M 26/05* (2016.02); *F05D 2220/40* (2013.01)

(58) Field of Classification Search
CPC .......... F01D 17/165; F01D 7/00; F02B 27/06; F02B 37/025; F02M 26/05; F05D 2220/40
See application file for complete search history.

(56) References Cited

U.S. PATENT DOCUMENTS

| 3,861,822 A * | 1/1975 | Wanger ................ F01D 17/162 |
| | | 415/147 |
| 9,845,770 B2 * | 12/2017 | Martinez-Botas ...... F02B 33/40 |
| 9,890,700 B2 * | 2/2018 | Sun ......................... F02B 39/00 |
| 9,932,843 B2 * | 4/2018 | Narehood ............... F01D 9/041 |
| 10,711,798 B2 * | 7/2020 | Halcoussis ............. F01D 9/041 |
| 2009/0136338 A1 * | 5/2009 | Laubender ............ F01D 17/165 |
| | | 415/159 |
| 2018/0266268 A1 * | 9/2018 | Karstadt ................... F02C 6/12 |
| 2020/0291800 A1 * | 9/2020 | Eckl ........................ F01D 9/047 |
| 2020/0291808 A1 * | 9/2020 | Eckl ...................... F02B 37/025 |

* cited by examiner

*Primary Examiner* — Jesse S Bogue (74) *Attorney, Agent, or Firm* — Harness, Dickey & Pierce, P.L.C.

(57) ABSTRACT

A turbine assembly includes a turbine casing, a turbine wheel, vanes, and link plates. The turbine casing defines a center chamber and a volute configured to transport exhaust gas to the center chamber. The turbine wheel is disposed within the center chamber and is rotatably coupled to the turbine casing. The driving ring extends around a periphery of the center chamber and is rotatably coupled to the turbine casing. The vanes are disposed within the center chamber and are configured to adjust a flow rate of exhaust gas from the volute to the turbine wheel. The link plates couple the vanes to the driving ring such that the vanes pivot when the driving ring rotates. When the ring is rotated to a given position, the link plates are configured to pivot one of the vanes to one position while pivoting another one of the vanes to another position.

20 Claims, 5 Drawing Sheets

ENGINE SYSTEM INCLUDING PIVOTING VANE TURBOCHARGER HAVING VANE(S) THAT ARE ADJUSTABLE TO ONE POSITION WHILE OTHER VANE(S) OF THE TURBOCHARGER ARE ADJUSTED TO ANOTHER POSITION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to engine systems including a pivoting vane turbocharger having one or more vanes that are adjustable to one position while one or more other vanes of the turbocharger are adjustable to another position.

Some engine systems include an engine having a first bank of cylinders and a second bank of cylinders, a first exhaust manifold fluidly coupled to the first bank of cylinders, and a second exhaust manifold fluidly coupled to the second bank of cylinders. The first and second exhaust manifolds deliver exhaust gas from the first and second bank of cylinders, respectively, to first and second volutes, respectively, of a turbine of a turbocharger. The turbine drives a compressor of the turbocharger, which pressurizes intake air and delivers the compressed intake air to the first and second bank of cylinders through first and second intake manifolds, respectively.

In some examples, an EGR line connects the first exhaust manifold to the first intake manifold, and an EGR valve is disclosed in the EGR line to control the recirculation of exhaust gas from the first exhaust manifold to the first intake manifold. When the EGR valve is open to recirculate exhaust gas from the exhaust manifold to the first intake manifold, the pressure in the first exhaust manifold is less than the pressure in the second exhaust manifold. In turn, the mass flow rate of exhaust gas passing through the first volute of the turbine is less than the mass flow rate of exhaust gas passing through the second volute of the turbine. This imbalance between the mass flow rates of exhaust gas passing through the first and second volutes of the turbine is undesired.

SUMMARY

A turbine assembly according to the present disclosure includes a turbine casing, a turbine wheel, a driving ring, a plurality of vanes, and a plurality of link plates. The turbine casing defines a center chamber and at least one volute configured to receive exhaust gas and to transport the exhaust gas to the center chamber. The turbine wheel is disposed within the center chamber and is coupled to the turbine casing in a manner that allows the turbine wheel to rotate about a rotational axis. The driving ring extends around a periphery of the center chamber and is coupled to the turbine casing in a manner that allows the driving ring to rotate about the rotational axis independent of rotation of the turbine wheel about the rotational axis. The plurality of vanes are disposed within the center chamber and are configured to adjust a flow rate of exhaust gas from the at least one volute to the turbine wheel. The plurality of vanes include a first vane and a second vane. The plurality of link plates pivotally couple the plurality of vanes to the driving ring in a manner that causes the plurality of vanes to pivot about a pivot axis when the driving ring rotates about the rotational axis. The plurality of link plates include a first link plate configured to pivot the first vane about its pivot axis to a first vane position and a second link plate configured to pivot the second vane about its pivot axis to a second vane position when the first vane is pivoted to the first vane position. The second vane position is different than the first vane position.

In one example, the first link plate has a first length and the second link plate has a second length that is different than the first length.

In one example, a difference between the first and second vane positions is within a range between 20 percent and 40 percent of a maximum opening position of the first and second vanes.

In one example, the first link plate is configured to pivot the first vane to the first vane position when the driving ring is rotated about the rotational axis to a first ring position, and the second link plate is configured to pivot the second vane to the second vane position when the driving ring is rotated about the rotational axis to the first ring position.

In one example, the turbine assembly further includes a driving lever attached to the driving ring and projecting radially outward from the driving ring, and an actuator coupled to the driving lever and operable to rotate the driving ring about the rotational axis.

In one example, the plurality of vanes include a first set of vanes and a second set of vanes, and the plurality of link plates includes a first set of link plates configured to pivot the first set of vanes to the first vane position and a second set of link plates configured to pivot the second set of vanes to the second vane position when the first set of vanes is pivoted to the first vane position.

In one example, each link plate in the first set of link plates has a first length, and each link plate in the second set of link plates has a second length that is different than the first length.

In one example, the at least one volute includes a first volute and a second volute, the first volute having an outlet that extends along a first portion of the center chamber, the second volute having an outlet that extends along a second portion of the center chamber, the first set of vanes is configured to adjust a flow rate of exhaust gas from the outlet of the first volute to the turbine wheel, and the second set of vanes is configured to adjust a flow rate of exhaust gas from the outlet of the second volute to the turbine wheel.

In one example, the plurality of vanes is located radially outboard of the turbine wheel, the first set of vanes is disposed radially between the outlet of the first volute and the turbine wheel, and the second set of vanes is disposed radially between the outlet of the second volute and the turbine wheel.

In one example, the first set of link plates is configured to pivot the first set of vanes between the first vane position and a third vane position, the second set of link plates is configured to pivot the second set of vanes between the second vane position and a fourth vane position, and the fourth vane position is one of (i) equal to the third vane position and (ii) within a predetermined range of the third vane position.

In one example, the fourth vane position is within the predetermined range of the third vane position, and the predetermined range is less than 5 percent of a maximum opening position of the first and second set of vanes.

In one example, the second set of link plates is configured to pivot the second set of vanes to the fourth vane position when the first set of link plates pivots the first set of vanes to the third vane position.

In one example, the first set of link plates is configured to pivot the first set of vanes from the first vane position to the third vane position when the driving ring is rotated about the rotational axis to from the first ring position to a second ring position, and the second set of link plates is configured to pivot the second set of vanes from the second vane position to the fourth vane position when the driving ring is rotated about the rotational axis to from the first ring position to the second ring position.

An engine system according to the present disclosure includes an engine and a turbine assembly. The engine includes a first bank of cylinders and a second bank of cylinders. The turbine assembly includes a turbine casing, a turbine wheel, a driving ring, a plurality of vanes, and a plurality of link plates. The turbine casing defines a center chamber, a first volute configured to receive exhaust gas from the first bank of cylinders and to transport the exhaust gas to the center chamber, and a second volute configured to receive exhaust gas from the second bank of cylinders and to transport the exhaust gas to the center chamber. The turbine wheel is disposed within the center chamber and is rotatably coupled to the turbine casing The driving ring extends around a periphery of the center chamber and is rotatably coupled to the turbine casing. The plurality of vanes are disposed within the center chamber. The plurality of vanes include a first set of vanes configured to adjust a flow rate of exhaust gas from the first volute to the turbine wheel and a second set of vanes configured to adjust a flow rate of exhaust gas from the second volute to the turbine wheel. The plurality of link plates pivotally couple the plurality of vanes to the driving ring. The plurality of link plates include a first set of link plates configured to pivot the first set of vanes to a first vane position and a second set of link plates configured to pivot the second set of vanes to a second vane position when the first set of vanes is pivoted to the first vane position. The second vane position is different than the first vane position.

In one example, the engine system further includes a first exhaust manifold configured to deliver exhaust gas from the first bank of cylinders to the first volute of the turbine assembly, and a second exhaust manifold configured to deliver exhaust gas from the first bank of cylinders to the second volute of the turbine assembly.

In one example, the engine system further includes a compressor assembly, a shaft, a first intake manifold, and a second intake manifold. The compressor assembly includes a compressor casing defining an inlet and an outlet, and a compressor wheel mounted to the compressor casing in a manner that allows the compressor wheel to rotate relative to the compressor casing and thereby pressurize intake air flowing from the inlet to the outlet. The shaft couples the compressor wheel to the turbine wheel such that rotation of the turbine wheel causes the compressor wheel to rotate. The first intake manifold is configured to deliver intake air from the outlet of the compressor casing to the first bank of cylinders. The second intake manifold is configured to deliver intake air from the outlet of the compressor casing to the second bank of cylinders.

In one example, the engine system further includes an exhaust gas recirculation (EGR) line connecting the first intake manifold to the first exhaust manifold, and an EGR valve disposed in the EGR line and configured to regulate a flow rate of exhaust gas from the first exhaust manifold to the first bank of cylinders.

In one example, the engine system further includes an actuator coupled to the driving ring, and a control module configured to control the actuator to rotate the driving ring between a first ring position and a second ring position based on a flow rate of exhaust gas through the EGR valve.

In one example, the first set of link plates is configured to pivot the first set of vanes from the first vane position to a third vane position when the driving ring is rotated from the first ring position to the second ring position, and the second set of link plates is configured to pivot the second set of vanes from the second vane position to a fourth vane position when the driving ring is rotated from the first ring position to the second ring position, a difference between the first and second vane positions is within a range between 20 percent and 40 percent of a maximum opening position of the first and second sets of vanes, and a difference between the third and fourth vane positions is within a range between 0 percent and 5 percent of the maximum opening position.

In one example, the control module is configured to control the actuator to rotate the driving ring to the first ring position when the flow rate of exhaust gas through the EGR valve is greater than a predetermined percentage of a total gas flow rate through the engine, and the control module is configured to control the actuator to rotate the driving ring to the second ring position when the flow rate of exhaust gas through the EGR valve is less than or equal to the predetermined percentage.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As discussed above, recirculating exhaust gas from only one bank of cylinders in an engine with two cylinder banks may cause unequal mass flow rates through two volutes of a turbine that receive exhaust gas from the two cylinder banks of the engine. More specifically, the mass the rate of exhaust gas through the volute that receives exhaust gas from the cylinder bank from which exhaust gas is recirculated may be less than the mass flow rate of exhaust gas through the volute that receives exhaust gas from the other cylinder bank. To address this issue, the present disclosure describes a pivoting vane turbocharger including a turbine with one or more vanes that are adjustable to one position while one or more other vanes of the turbine are adjusted to another position.

In one example, the turbine includes first and second volutes, a first set of vanes, a second set of vanes, a driving ring, a first set of link plates, a second set of link plates, a linear actuator, and a driving lever. The first and second sets of vanes are disposed upstream of the first and second volutes, respectively, to regulate the mass flow rate of exhaust gas passing therethrough. The first and second sets of link plates connect the first and second sets of vanes, respectively, to the driving ring. The driving lever connects the linear actuator to the driving ring. When the linear actuator extends or retracts, the driving ring rotates about a rotational axis, which causes the first and second set of vanes to pivot about their respective pivot axes.

The first and second set of link plates are configured to pivot the first and second vanes to different positions when the driving ring is in a given rotational position. In one example, when the driving ring is rotated to a first position, the first set of link plates pivot the first set of vanes to a closed position (e.g., zero percent open), and the second set of link plates pivot the second set of vanes to a first partially open position (e.g., 20-40 percent open). In addition, when the driving ring is rotated to a second position, the first and second set of link plates respectively pivot the first and second sets of vanes to other partially open positions that are within a small percentage (e.g., 5 percent) of one another.

When the first set of vanes are in the closed position while the second set of vanes are in the first partially open position, the flow area between the first set of vanes is less than the flow area between the second set of vanes. Therefore, the first set of vanes has a greater nozzle effect than the second set of vanes. In other words, the amount by which the first set of vanes increases the mass flow rate of exhaust gas passing therethrough is greater than the amount by which the second set of vanes increases the mass flow rate of exhaust gas passing therethrough.

A control system according to the present disclosure uses this ability to adjust the vanes to different positions to prevent unequal mass flow rates of exhaust gas passing through the volutes when exhaust gas is recirculated from only one cylinder bank. In one example, the control system adjusts the driving ring to the first position, and thereby adjusts the first and second sets of vanes to the closed position and the partially open position, when the amount of exhaust gas recirculated is greater than a threshold. When the amount of exhaust gas recirculation is less than or equal to the threshold, the control system adjusts the driving ring to the second position, and thereby adjusts the first and second sets of vanes to the other partially open positions.

Although the present disclosure describes a turbine including two volutes, the principles of the present disclosure apply to dual volute turbines or single volute turbines. In addition, while the present disclosure describes a turbine including a single driving ring, the principles of the present disclosure apply to turbines including one or more driving rings. Further, while the present disclosure describes the turbine including vanes that are adjustable to different positions at the same time using a single actuator, the adjustment of the vanes may be done using multiple actuators.

Figure 1:
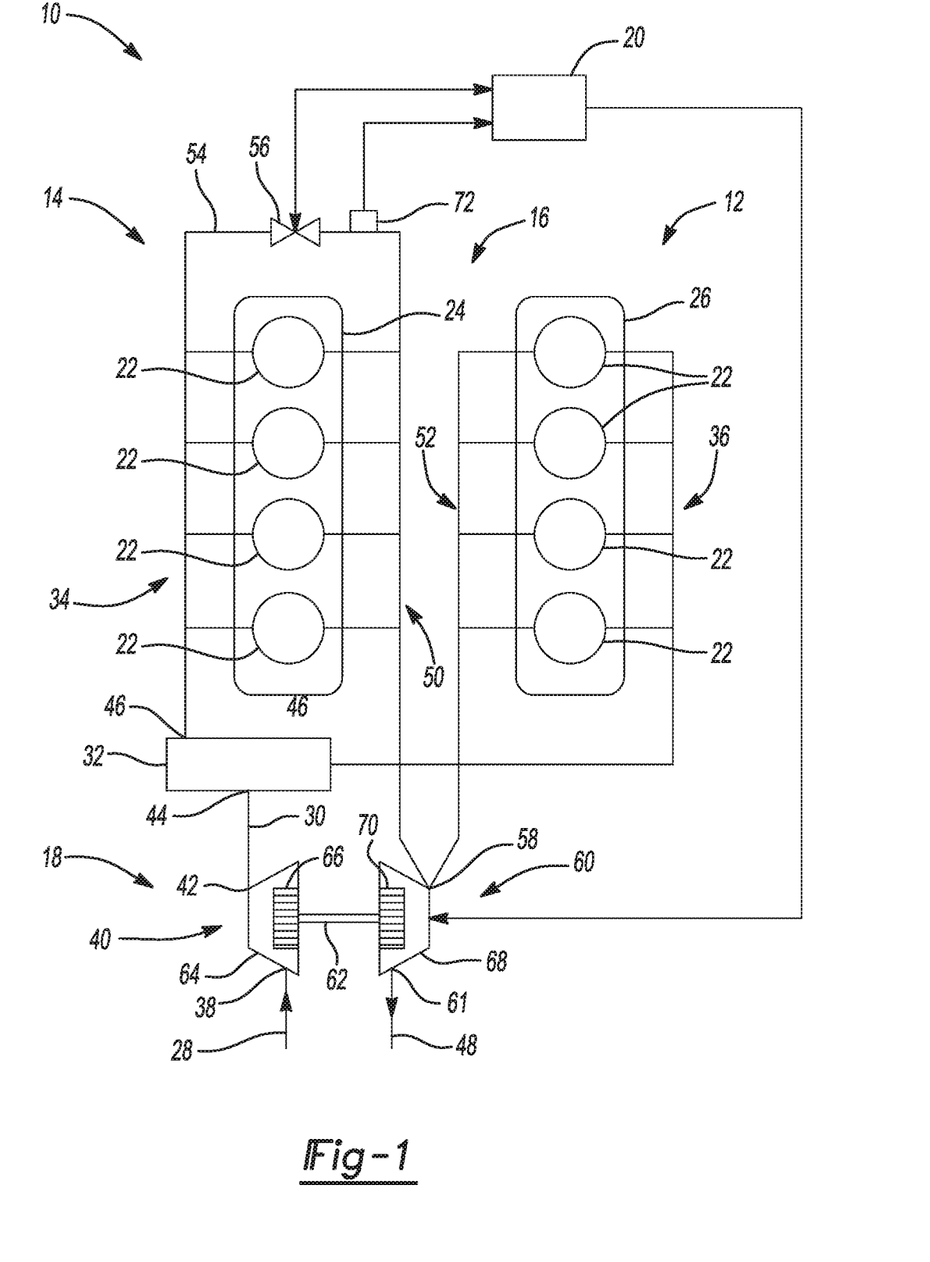
FIG. 1 is a functional block diagram of an example engine system according to the present disclosure.

Referring now to FIG. 1, an engine system 10 includes an engine 12, an intake system 14, and exhaust system 16, a turbocharger 18, and an engine control module (ECM) 20. The engine 12 includes a plurality of cylinders 22, with one-half of the cylinders 22 disposed in a first bank 24 and one-half of the cylinders 22 disposed in a second bank 26. Although the engine 12 is represented as an eight-cylinder engine with four cylinders disposed in each of the first and second banks 24 and 26, the engine 12 may have additional or fewer cylinders.

The intake system 14 includes a low-pressure intake line 28, a high-pressure intake line 30, a charge air cooler (CAC) 32, a first intake manifold 34, and a second intake manifold 36. The low-pressure intake line 28 provides intake air at ambient pressure to an inlet 38 of a compressor 40 in the turbocharger 18. The high-pressure intake line 30 delivers intake air from an outlet 42 of the compressor 40 to an inlet 44 of the CAC 32.

The CAC 32 cools intake air flowing from the inlet 44 of the CAC 32 to an outlet 46 of the CAC 32 using, for example, water cooled by ambient airflow. The first intake manifold 34 delivers intake air from the outlet 46 of the CAC 32 to the cylinders 22 in the first bank 24 of the engine 12. The second intake manifold 36 delivers intake air from the outlet 46 of the CAC 32 to the cylinders 22 in the second bank 26 of the engine 12.

The exhaust system 16 includes a low-pressure exhaust line 48, a first exhaust manifold 50, a second exhaust manifold 52, an exhaust gas recirculation (EGR) line 54, and an EGR valve 56. The first exhaust manifold 50 delivers exhaust gas from the cylinders 22 in the first bank 24 of the engine 12 to an inlet 58 of a turbine 60 in the turbocharger 18. The second exhaust manifold 52 delivers exhaust gas from the cylinders 22 in the second bank 26 of the engine 12 to the inlet 58 of the turbine 60.

The low-pressure exhaust line 48 delivers exhaust gas from an outlet 61 of the turbine 60 to an emissions reduction system (not shown). The EGR line 54 delivers exhaust gas from the first exhaust manifold 50 to the first intake manifold 34. The EGR valve 56 is disposed in the EGR line 54 and regulates the flow rate of exhaust gas through the EGR line 54.

The turbocharger 18 includes the compressor 40, the turbine 60, and a shaft 62. The compressor 40 includes a compressor casing 64 and a compressor wheel 66 disposed within the compressor casing 64 and is mounted to the compressor casing 64 in a manner that allows the compressor wheel 66 to rotate about a rotational axis 67. The turbine 60 includes a turbine casing 68 and a turbine wheel 70 disposed within the turbine casing 68 and mounted to the turbine casing 68 in a manner that allows the turbine wheel 70 to rotate about a rotational axis 71. The shaft 62 connects the compressor wheel 66 to the turbine wheel 70 so that rotation of the turbine wheel 70 causes the compressor wheel 66 to rotate.

The ECM 20 adjusts the position of the EGR valve 56 to achieve a desired rate of exhaust gas flow through the EGR line 54. The ECM 20 may adjust the position of the EGR valve 56 in a closed-loop manner by minimizing a difference between an actual flow rate of exhaust gas through the EGR line 54 and a desired flow rate of exhaust gas through the EGR line 54. The actual flow rate of exhaust gas through the EGR line 54 may be measured using a flow rate sensor 72. Alternatively, the ECM 20 may adjust the position of the EGR valve 56 in an open-loop manner based on a predetermined relationship between the position of the EGR valve 56 and the flow rate of exhaust gas through the EGR line 54. The ECM 20 also adjusts a vane position of the turbine 60 based on the flow rate of exhaust gas through the EGR line 54, as discussed in more detail below.

Figure 2:
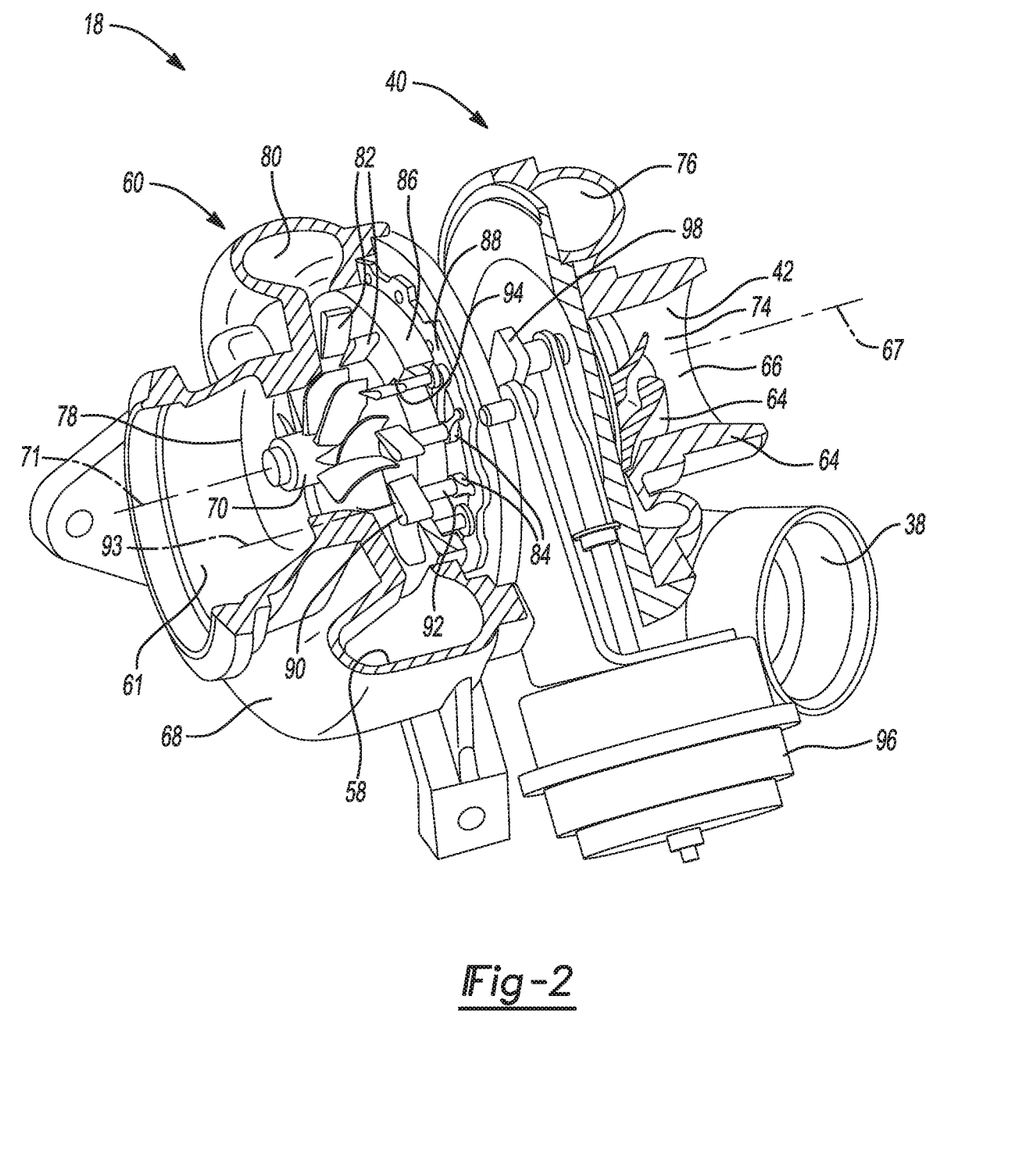
FIG. 2 is a sectioned perspective view of an example turbocharger assembly according to the present disclosure.

Referring now to FIG. 2, an example implementation of the turbocharger 18 is shown. As discussed above, the turbocharger 18 includes the compressor 40 and turbine 60, the compressor 40 includes the compressor casing 64 and the compressor wheel 66, and the turbine 60 includes the turbine casing 68 and the turbine wheel 70. The compressor casing 64 defines the inlet 38 of the compressor 40 and the outlet 42 of the compressor 40. Similarly, the turbine casing 68 defines the inlet 58 of the turbine 60 and the outlet 61 of the turbine 60.

The compressor casing 64 also defines a center chamber 74 and a volute 76 that extends around a peripheral of the center chamber 74. The compressor wheel 66 is disposed within the center chamber 74. The volute 76 delivers intake air from the inlet 38 of the compressor 40 to the center chamber 74 of the compressor 40. As the compressor wheel 66 rotates relative to the compressor casing 64, the compressor wheel 66 compresses the intake air in the center chamber 74 and directs the compressed intake air toward the outlet 42 of the compressor 40.

Similarly, the turbine casing 68 also defines a center chamber 78 and a volute 80 that extends around a peripheral of the center chamber 78. The turbine wheel 70 is disposed within the center chamber 78. The volute 80 delivers exhaust gas from the inlet 58 of the turbine 60 to the center chamber 78 of the turbine 60. As exhaust gas flows through the center chamber 78 and past the turbine wheel 70 on its way to the outlet 61 of the turbine 60, the exhaust gas causes the turbine wheel 70 to rotate. In this manner, exhaust gas flowing through the turbine 60 causes the turbine wheel 70 to rotate, which in turn causes the compressor wheel 66 of the compressor 40 to rotate and thereby pressurize intake air delivered to the engine 12.

The turbine 60 further includes a plurality of vanes 82, a plurality of link plates 84, a unison ring 86, and an adjustable or driving ring 88. The vanes 82 are disposed in the center chamber 78 of the turbine 60 and are located radially outboard of the turbine wheel 70. The vanes 82 are located radially between the turbine wheel 70 and the volute 80, and are pivotable to act as a throttle and thereby regulate the rate of exhaust gas flow from the volute 80 to the turbine wheel 70. Each of the vanes 82 includes a wing-shaped portion 90 and a shaft 92. The shaft 92 connects the wing-shaped portion 90 to one of the link plates 84, and the central longitudinal axis of the shaft 92 forms a pivot axis 93 of the corresponding vane 82.

Each of the link plates 84 connects one of the vanes 82 to the driving ring 88. The unison ring 86 defines a plurality of holes 94, with each of the holes 94 receiving one of the vane shafts 92. The unison ring 86 is fixed relative to the turbine casing 68. The driving ring 88 is coupled to the turbine casing 68 in a manner that allows the driving ring 88 to rotate relative to the turbine casing 68 about the rotational axis 71.

As the driving ring 88 rotates relative to the turbine casing 68 about the rotational axis 71, the unison ring 86 prevents the vanes 82 from rotating with the driving ring 88. Instead, the link plates 84 pivot relative to the driving ring 88, which causes the vanes 82 to pivot about their respective pivot axes 93 (i.e., the central longitudinal axis of their shaft 92). In turn, the spacing between the vanes 82 changes, which affects the rate of exhaust gas flow through the vanes 82. Decreasing the spacing between the vanes 82 has a nozzle effect, which increases the rate of exhaust gas flow through the vanes 82 from the volute 80 to the turbine wheel 70. Increasing the spacing between the vanes 82 decreases the rate of exhaust gas flow through the vanes 82 from the volute 80 to the turbine wheel 70.

The link plates 84 and/or the connection between the link plates 84 and the vanes 82 are configured so that, for a given rotational position of the driving ring 88, at least one of the vanes 82 is in a different pivot position than another one of the vanes 82. This can be accomplished by forming the link plates 84 to have different lengths and/or attaching the link plates 84 to different locations on the vanes 82. In one example, for a given rotational position of the driving ring 88, one-half of the vanes 82 are in one pivot position while the other half of the vanes 82 are in a different pivot position. In another example, for a given rotational position of the driving ring 88, each of the vanes 82 is in a different pivot position than each of the other vanes 82.

A linear actuator 96 rotates the driving ring 88 about the rotational axis 71. The linear actuator 96 may be a pneumatic actuator. A driving lever 98 connects the linear actuator 96 to the driving ring 88 so that the driving ring 88 rotates about the rotational axis 71 when the linear actuator 96 moves linearly. The linear actuator 96 in the driving ring 88 may be considered part of the turbine 60 and/or a turbine assembly that includes the turbine 60.

Figure 3:
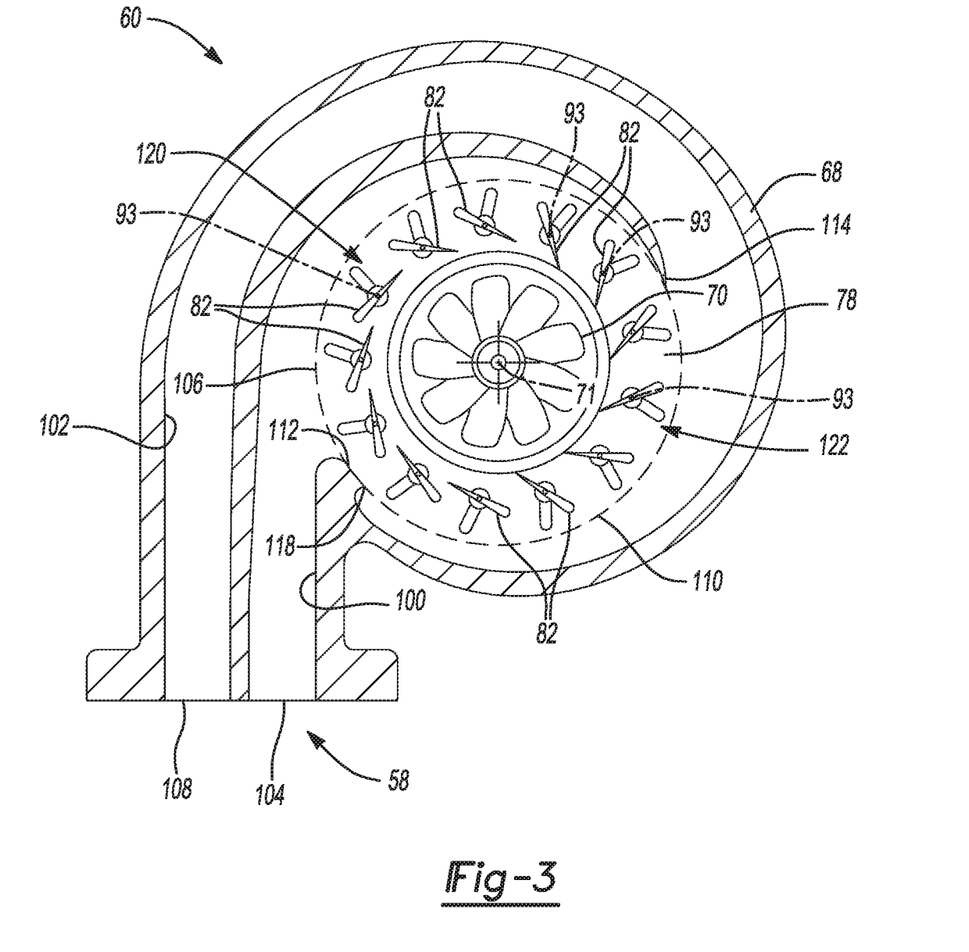
FIG. 3 is a section view of an example turbine assembly according to the present disclosure, the turbine assembly including a first volute, a second volute, a first set of vanes associated with the first volute, and a second set of vanes associated with the second volute, where the first set of vanes is in a first position, and the second set of vanes is in a second position.

In FIG. 2, the turbine 60 is depicted as a single volute turbine. In contrast, FIG. 3 depicts the turbine 60 as a dual volute turbine. More specifically, in place of the volute 80, the turbine 60 includes an inner volute 100 and an outer volute 102. The inner volute 100 has an inlet 104 and an outlet 106. Similarly, the outer volute 102 has an inlet 108 and an outlet 110.

The inlets 104, 108 of the inner and outer volutes 100 and 102 collectively form the inlet 58 of the turbine 60. The outlet 106 of the inner volute 100 extends around the outer periphery of the turbine center chamber 78 from a first location 112 two a second location 114. Similarly, the outlet 110 of the outer volute 102 extends around the outer periphery of the turbine center chamber 78 from the second location 114 to a third location 118.

In the example shown, a first set 120 of the vanes 82 are located radially between the outlet 106 of the inner volute 100 and the turbine wheel 70, and a second set 122 of the vanes 82 are located radially between the outlet 110 of the outer volute 102 and the turbine wheel 70. Thus, the first set 120 of the vanes 82 regulate the flow rate of exhaust gas from the outlet 106 of the inner volute 100 to the turbine wheel 70, while the second set 122 of the vanes 82 regulate the flow rate of exhaust gas from the outlet 110 of the outer volute 102 to the turbine wheel 70. Therefore, the first set 120 of the vanes 82 are associated with the inner volute 100, while the second set 122 of the vanes 82 are associated with the outer volute 102.

In the example shown, the turbine 60 includes a total of 13 of the vanes 82, with seven of the vanes 82 distributed in the first set 120 and six of the vanes 82 distributed in the second set 122. In other examples, the turbine 60 may include an even number of the vanes 82, with one-half of the vanes 82 distributed in the first set 120 and one-half of the vanes 82 distributed in the second set 122. Thus, one-half of the vanes 82 may be associated with the inner volute 100, and one-half of the vanes 82 may be associated with the outer volute 102.

In the example shown, the first set 120 of the vanes 82 are pivoted to a first vane position, while the second set 122 of the vanes 82 are pivoted to a second vane position that is different than the first vane position. The flow area between the vanes 82 in the first vane position is less than the flow area between the vanes 82 in the second vane position, and therefore the nozzle effect of the first set 120 of the vanes 82 is greater than the nozzle effect of the second set 122 of the vanes 82. Thus, assuming that the pressures in the inner and outer volute 100 and 102 are equal, the rate of exhaust gas flow through the first set 120 of the vanes 82 is greater than the rate of exhaust gas flow through the second set 122 of the vanes 82.

Figure 4:
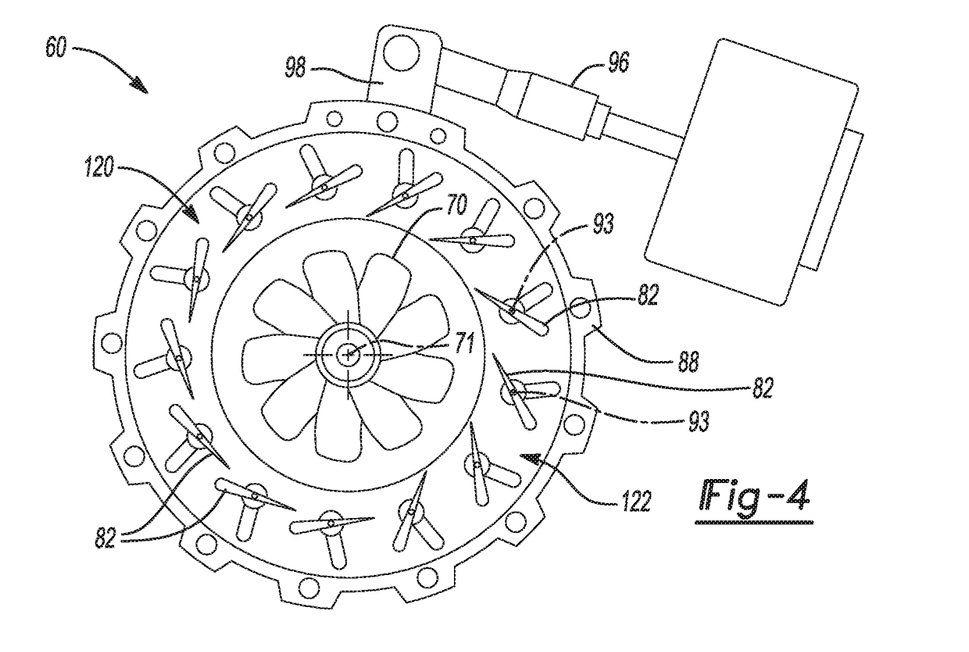
FIG. 4 is a side view of an example turbine assembly according to the present disclosure, the turbine assembly including a driving ring and an actuator, where the actuator is maintaining the driving ring in a first position.

FIG. 4 is similar to FIG. 3 except that FIG. 4 also shows the driving ring 88, the linear actuator 96, and the driving lever 98, and FIG. 4 does not show the turbine casing 68. The positioning of the vanes 82 is the same in FIG. 4 is it is in FIG. 3. In both FIGS. 3 and 4, the first half 120 of the vanes 82 are in the first vane position relative to their respective pivot axes 93, and the second set 122 of the vanes 82 are in the second vane position relative to their respective pivot axes 93. In addition, the driving ring 88 is in a first ring position relative to the rotational axis 71.

The first vane position may be equal to, or nearly equal to, zero percent of a maximum opening position of the vanes 82. The vanes 82 may be at their maximum opening position when the vanes 82 are oriented parallel to one another. The second vane position may be within a range between 20 percent of the maximum opening position and 40 percent of the maximum opening position. Thus, the difference between the first and second vane positions may be within a range between 20 percent and 40 percent of the maximum opening position.

Figure 5:
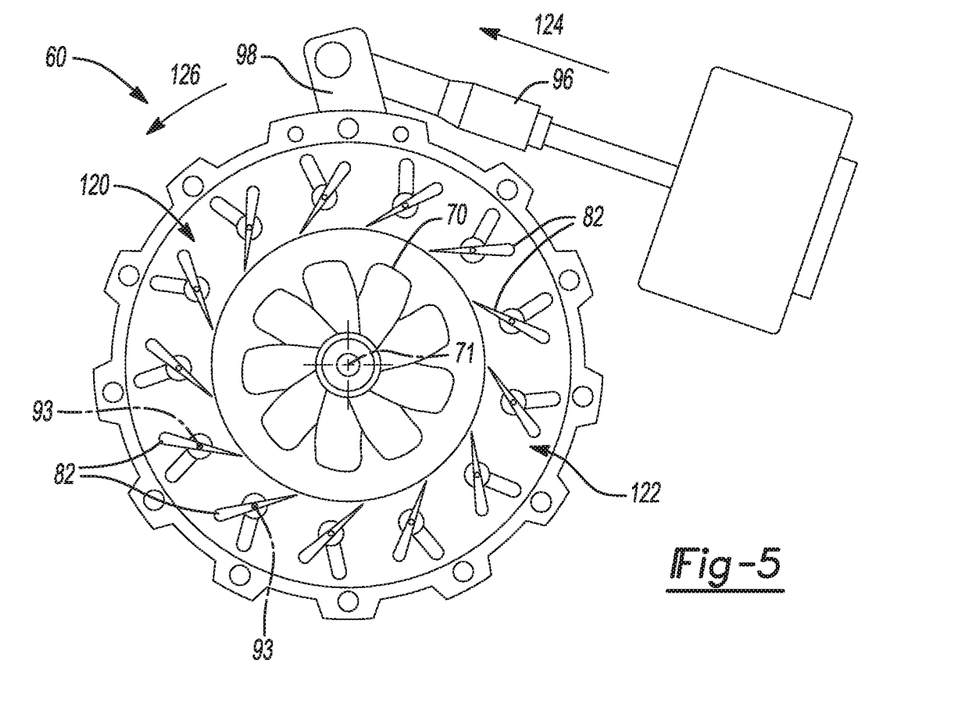
FIG. 5 is a side view of the turbine assembly of FIG. 4 where the actuator has adjusted the driving ring from the first position to a second position.

In FIG. 5, the linear actuator 96 has moved in a first direction 124 relative to its position shown in FIG. 4. As a result, the driving ring 88 has rotated about the rotational axis 71 in a counterclockwise direction 126 from the first ring position shown in FIG. 4 to a second ring position shown in FIG. 5. In addition, the first half 120 of the vanes 82 have pivoted about their respective pivot axes 93 from the first vane position to a third vane position, and the second set 122 of the vanes 82 have pivoted about their respective pivot axes 93 from the second vane position to a fourth vane position.

The third vane position may be equal to 40 percent of the maximum opening position of the vanes 82. Additionally or alternatively, the difference between the third and fourth vane positions may be less than 5 percent of the maximum opening position of the vanes 82. For example, the third vane position may be equal to 40 percent of the maximum opening position of the vanes 82, and the fourth vane position may be within a range between 40 percent and 45 percent of the maximum opening position of the vanes 82.

Referring now to FIGS. 1, 3, 4, and 5, the inlet 104 of the inner volute 100 of the turbine 60 may be connected to the first exhaust manifold 50 to receive exhaust gas therefrom, and the inlet 108 of the outer volute 102 of the turbine 60 may be connected to the second exhaust manifold 52 to receive exhaust gas therefrom. Thus, when exhaust gas is recirculated from the first exhaust manifold 50 to the first intake manifold 34 via the EGR line 54 and EGR valve 56, the pressure in the inner volute 100 may be less than the pressure in the outer volute 102. In turn, if the vanes 82 in the first set 120 and the vanes 82 in the second set 122 were in the same position, the rate of exhaust gas flow through the inner volute 100 may be less than the rate of exhaust gas flow through the outer volute 102. This imbalance between the rates of exhaust gas flow through the inner and outer volutes 100 and 102 may cause an imbalance between the rate of exhaust gas flow through the first and second exhaust manifold 50 and 52, which is undesired.

To avoid this issue, the control module 20 may control the linear actuator 96 to adjust the driving ring 88 to the first ring position of FIG. 4 when the flow rate of exhaust gas through the EGR line 54 is greater than 10 percent of a total rate of exhaust gas flow through the engine 12. As discussed above, when the driving ring 88 is in the first ring position, the first set 120 of the vanes 82 are in the first vane position and the second set 122 of the vanes 82 are in the second vane position. In addition, the vanes 82 in the first vane position have a greater nozzle effect than the vanes 82 in the second vane position. In other words, the vanes 82 in the first vane position increase the rate of exhaust gas flow therethrough by a greater amount than the amount by which the vanes 82 in the second vane position increase the rate of exhaust gas flow therethrough. Thus, by adjusting the driving ring 88 to the first ring position and thereby adjusting the vanes 82 in the first and second sets 120 and 122 to the first and second vane positions, the control module 20 may compensate for and eliminate any flow imbalance between the inner and outer volutes 100 and 102.

When the flow rate of exhaust gas through the EGR line 54 is less than or equal to 10 percent of the total rate of exhaust gas flow through the engine 12, any difference between the pressures in the first and second exhaust manifold 50 and 52 may be relatively small. Thus, it may not be necessary to adjust the first set 120 of the vanes 82 to a different (e.g., more closed) position than the second set 122 of the vanes 82 in order to compensate for a flow imbalance between the inner and outer volutes 100 and 102. Therefore, when the flow rate of exhaust gas through the EGR line 54 is less than or equal to 10 percent of the total rate of exhaust gas flow through the engine 12, the control module 20 may control the linear actuator 96 to adjust the driving ring 88 to the second ring position of FIG. 5.

As discussed above, when the driving ring 88 is in the second position, the first set 120 of the vanes 82 are in the third vane position and the second set 122 of the vanes 82 are in the fourth vane position. In addition, the difference between the third and fourth vane positions may be less than 5 percent of the maximum opening position of the vanes 82. Thus, the nozzle effect of the vanes 82 in the first set 120 may be about the same as the nozzle effect of the vanes 82 in the second set 122.

Figure 6:
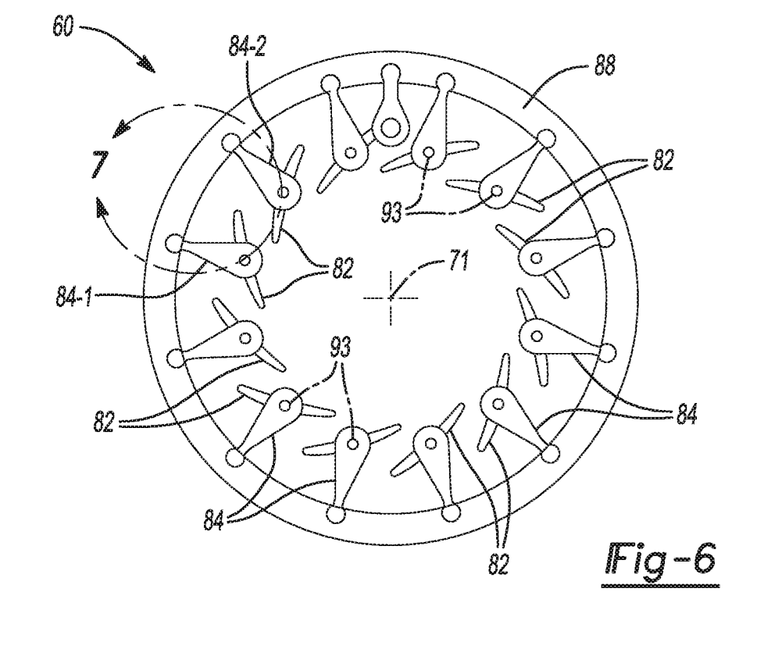
FIG. 6 is a side view of an example turbine assembly according to the present disclosure, the turbine assembly including a driving ring, a plurality of vanes, and a plurality of link plates.
Figure 7:
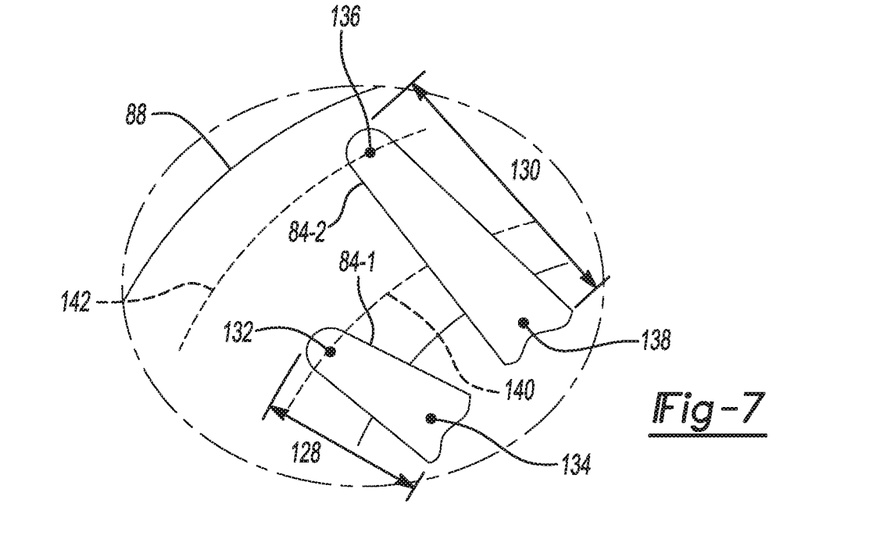
FIG. 7 is a close-up view of a portion of the turbine assembly of FIG. 6.

Referring now to FIGS. 6 and 7, an example implementation of the turbine 60 is shown in which the link plates 84 including a first link plate 84-1 and a second link plate 84-2. The first link plate 84-1 has a first length 128 and the second link plate 84-2 has a second length 130. The second length 130 is greater than the first length 128.

The first link plate 84-1 is attached to the driving ring 88 at a first pivot point 132, and the first link plate 84-1 is attached to one of the vane detect a second pivot point 134. The second link plate 84-2 is attached to the driving ring 88 at a first pivot point 136, and the second link plate 84-1 is attached to one of the vane detect a second pivot point 138. As the driving ring 88 rotates about the rotational axis 71, the first pivot point 132 of the first link plate 84-1 pivots through a first arc 140 and the first pivot point 136 pivots through a second arc 142.

Due to the difference between the first and second lengths 130 and 132, the first arc 140 through which the first link plate 84-1 pivots is different than the second arc 142 through which the second link plate 84-2 pivots. More specifically, the first arc 140 of the first link plate 84-1 has a first radius, and the second arc 142 of the second link plate 84-2 has a second radius that is greater than the first radius. Thus, for a given amount of rotation of the driving ring 88, the first link plate 84-1 pivots through a greater angle than the angle by which the second link plate 84-2 pivots through. In turn, the vane 82 connected to the first link plate 84-1 pivots about its pivot axis 93 by a greater angle than the angle by which the vane 82 connected to the second link plate 84-2 pivots about its pivot axis 93.

When the driving ring 88 rotates between its end stop positions, the vanes 82 connected to the driving ring 88 by the first link plate 84-1 pivot between the first and third vane positions, and the vanes 82 connected to the driving ring 88 by the second link plate 84-2 pivot between the second and fourth vane positions. In one example, the first vane position is equal to zero percent of the maximum opening position of the vanes 82, the second vane position is within a range between 20 percent and 40 percent of the maximum opening position, and each of the third and fourth vane positions are equal to 100 percent of the maximum opening position.

In the examples shown in FIGS. 3-5, the first link plate 84-1 may be used to connect the first set 120 of the vanes 82 to the driving ring 88, and the second link plate 84-2 may be used to connect the second set 122 of the vanes 82 to the driving ring 88. As a result, for a given amount of rotation of the driving ring 88, the first set 120 of the vanes 82 may pivot about their respective pivot axes 93 by a greater amount than the amount by which the second set 122 of the vanes 82 pivot about their respective pivot axes 93. Thus, when a driving ring 88 rotates as it does from FIG. 4 to FIG. 5, there is a noticeable change in the positions of the vanes 82 of the first set 120, while there is little to no noticeable change in the positions of the vanes 82 of the second set 122.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A turbine assembly comprising:
a turbine casing defining a center chamber and at least one volute configured to receive exhaust gas and to transport the exhaust gas to the center chamber;
a turbine wheel disposed within the center chamber and coupled to the turbine casing in a manner that allows the turbine wheel to rotate about a rotational axis;
a driving ring extending around a periphery of the center chamber and coupled to the turbine casing in a manner that allows the driving ring to rotate about the rotational axis independent of rotation of the turbine wheel about the rotational axis;
a plurality of vanes disposed within the center chamber and configured to adjust a flow rate of exhaust gas from the at least one volute to the turbine wheel, the plurality of vanes including a first vane and a second vane; and
a plurality of link plates pivotally coupling the plurality of vanes to the driving ring in a manner that causes the plurality of vanes to pivot about a pivot axis when the driving ring rotates about the rotational axis, the plurality of link plates including a first link plate configured to pivot the first vane about its pivot axis to a first vane position and a second link plate configured to pivot the second vane about its pivot axis to a second vane position when the first vane is pivoted to the first vane position, wherein the second vane position is different than the first vane position, and wherein the first link plate has a first length and the second link plate has a second length that is different than the first length.

2. The turbine assembly of claim 1 wherein a difference between the first and second vane positions is within a range between 20 percent and 40 percent of a maximum opening position of the first and second vanes.

3. The turbine assembly of claim 1 wherein:
the first link plate is configured to pivot the first vane to the first vane position when the driving ring is rotated about the rotational axis to a first ring position; and
the second link plate is configured to pivot the second vane to the second vane position when the driving ring is rotated about the rotational axis to the first ring position.

4. The turbine assembly of claim 1 further comprising:
a driving lever attached to the driving ring and projecting radially outward from the driving ring; and
an actuator coupled to the driving lever and operable to rotate the driving ring about the rotational axis.

5. The turbine assembly of claim 1 wherein:
the plurality of vanes include a first set of vanes and a second set of vanes; and
the plurality of link plates includes a first set of link plates configured to pivot the first set of vanes to the first vane position and a second set of link plates configured to pivot the second set of vanes to the second vane position when the first set of vanes is pivoted to the first vane position.

6. The turbine assembly of claim 5 wherein:
each link plate in the first set of link plates has the first length; and
each link plate in the second set of link plates has the second length.

7. The turbine assembly of claim 5 wherein:
the at least one volute includes a first volute and a second volute, the first volute having an outlet that extends along a first portion of the center chamber, the second volute having an outlet that extends along a second portion of the center chamber;
the first set of vanes is configured to adjust the flow rate of exhaust gas from the outlet of the first volute to the turbine wheel; and
the second set of vanes is configured to adjust a flow rate of exhaust gas from the outlet of the second volute to the turbine wheel.

8. The turbine assembly of claim 7 wherein:
the plurality of vanes is located radially outboard of the turbine wheel;
the first set of vanes is disposed radially between the outlet of the first volute and the turbine wheel; and
the second set of vanes is disposed radially between the outlet of the second volute and the turbine wheel.

9. The turbine assembly of claim 5 wherein:
the first set of link plates is configured to pivot the first set of vanes between the first vane position and a third vane position;
the second set of link plates is configured to pivot the second set of vanes between the second vane position and a fourth vane position; and
the fourth vane position is one of (i) equal to the third vane position and (ii) within a predetermined range of the third vane position.

10. The turbine assembly of claim 9 wherein:
the fourth vane position is within the predetermined range of the third vane position; and
the predetermined range is less than 5 percent of a maximum opening position of the first and second set of vanes.

11. The turbine assembly of claim 9 wherein the second set of link plates is configured to pivot the second set of vanes to the fourth vane position when the first set of link plates pivots the first set of vanes to the third vane position.

12. The turbine assembly of claim 9 wherein:
the first set of link plates is configured to pivot the first set of vanes from the first vane position to the third vane position when the driving ring is rotated about the rotational axis to from a first ring position to a second ring position; and
the second set of link plates is configured to pivot the second set of vanes from the second vane position to the fourth vane position when the driving ring is rotated about the rotational axis to from the first ring position to the second ring position.

13. An engine system comprising:
an engine including a first bank of cylinders and a second bank of cylinders; and
a turbine assembly including:
  a turbine casing defining a center chamber, a first volute configured to receive exhaust gas from the first bank of cylinders and to transport the exhaust gas to the center chamber, and a second volute configured to receive exhaust gas from the second bank of cylinders and to transport the exhaust gas to the center chamber;
  a turbine wheel disposed within the center chamber and rotatably coupled to the turbine casing;
  a driving ring extending around a periphery of the center chamber and rotatably coupled to the turbine casing;
  a plurality of vanes disposed within the center chamber, the plurality of vanes including a first set of vanes configured to adjust a flow rate of exhaust gas from the first volute to the turbine wheel and a second set of vanes configured to adjust a flow rate of exhaust gas from the second volute to the turbine wheel; and
  a plurality of link plates pivotally coupling the plurality of vanes to the driving ring, the plurality of link plates including a first set of link plates configured to pivot the first set of vanes to a first vane position and a second set of link plates configured to pivot the second set of vanes to a second vane position when the first set of vanes is pivoted to the first vane position, wherein the second vane position is different than the first vane position, and wherein each link plate in the first set of link plates has a first length and each link plate in the second set of link plates has a second length that is different than the first length.

14. The engine system of claim 13 further comprising:
a first exhaust manifold configured to deliver exhaust gas from the first bank of cylinders to the first volute of the turbine assembly; and
a second exhaust manifold configured to deliver exhaust gas from the first bank of cylinders to the second volute of the turbine assembly.

15. The engine system of claim 14 further comprising:
a compressor assembly including a compressor casing defining an inlet and an outlet and a compressor wheel mounted to the compressor casing in a manner that allows the compressor wheel to rotate relative to the compressor casing and thereby pressurize intake air flowing from the inlet to the outlet;
a shaft coupling the compressor wheel to the turbine wheel such that rotation of the turbine wheel causes the compressor wheel to rotate;
a first intake manifold configured to deliver intake air from the outlet of the compressor casing to the first bank of cylinders; and
a second intake manifold configured to deliver intake air from the outlet of the compressor casing to the second bank of cylinders.

16. The engine system of claim 15 further comprising:
an exhaust gas recirculation (EGR) line connecting the first intake manifold to the first exhaust manifold; and
an EGR valve disposed in the EGR line and configured to regulate a flow rate of exhaust gas from the first exhaust manifold to the first bank of cylinders.

17. The engine system of claim 16 further comprising:
an actuator coupled to the driving ring; and
a control module configured to control the actuator to rotate the driving ring between a first ring position and a second ring position based on a flow rate of exhaust gas through the EGR valve.

18. The engine system of claim 17 wherein:
the first set of link plates is configured to pivot the first set of vanes from the first vane position to a third vane position when the driving ring is rotated from the first ring position to the second ring position;
the second set of link plates is configured to pivot the second set of vanes from the second vane position to a fourth vane position when the driving ring is rotated from the first ring position to the second ring position;
a difference between the first and second vane positions is within a range between 20 percent and 40 percent of a maximum opening position of the first and second sets of vanes; and
a difference between the third and fourth vane positions is within a range between 0 percent and 5 percent of the maximum opening position.

19. The engine system of claim 18 wherein the control module is configured to:
control the actuator to rotate the driving ring to the first ring position when the flow rate of exhaust gas through the EGR valve is greater than a predetermined percentage of a total gas flow rate through the engine; and
control the actuator to rotate the driving ring to the second ring position when the flow rate of exhaust gas through the EGR valve is less than or equal to the predetermined percentage.

20. A turbine assembly comprising:
a turbine casing defining a center chamber and at least one volute configured to receive exhaust gas and to transport the exhaust gas to the center chamber;
a turbine wheel disposed within the center chamber and coupled to the turbine casing in a manner that allows the turbine wheel to rotate about a rotational axis;

a driving ring extending around a periphery of the center chamber and coupled to the turbine casing in a manner that allows the driving ring to rotate about the rotational axis independent of rotation of the turbine wheel about the rotational axis;

a plurality of vanes disposed within the center chamber and configured to adjust a flow rate of exhaust gas from the at least one volute to the turbine wheel, the plurality of vanes including a first vane and a second vane; and a plurality of link plates pivotally coupling the plurality of vanes to the driving ring in a manner that causes the plurality of vanes to pivot about a pivot axis when the driving ring rotates about the rotational axis, the plurality of link plates including a first link plate configured to pivot the first vane about its pivot axis through a first angle when the driving ring is rotated by a first amount and a second link plate configured to pivot the second vane about its pivot axis through a second angle when the driving ring is rotated by the first amount, wherein the second angle is different than the first angle.

\* \* \* \* \*